Feb. 21, 1950    E. F. FADER    2,498,405
CONTINUOUS VIBRATING REACTION CHAMBER
Filed March 11, 1946

INVENTOR:
EDMUND F. FADER.
BY
ATTY

Patented Feb. 21, 1950

2,498,405

UNITED STATES PATENT OFFICE 2,498,405

CONTINUOUS VIBRATING REACTION CHAMBER

Edmund F. Fader, Philadelphia, Pa., assignor to The Jeffrey Manufacturing Company, a corporation of Ohio Application March 11, 1946, Serial No. 653,683

6 Claims. (Cl. 23—252)

This invention relates to a reaction chamber adapted to treat a continuous flow of material in a very efficient manner.

An object of the invention therefore is to provide a continuous type of reaction chamber and particularly one which is provided with vibration to fluidize the bed and produce conveying action thereof.

A further object of the invention is to provide apparatus of the above mentioned type with means to introduce a fluid, preferably a gas, to produce desired reaction either with or without means to remove the excess or spent gas and other vapors.

A further object of the invention is to provide an improved process for producing a reaction involving a continuously flowing stream of granular material.

Other objects of the invention will appear hereinafter, the novel features and combinations being set forth in the appended claims.

Figure 1:
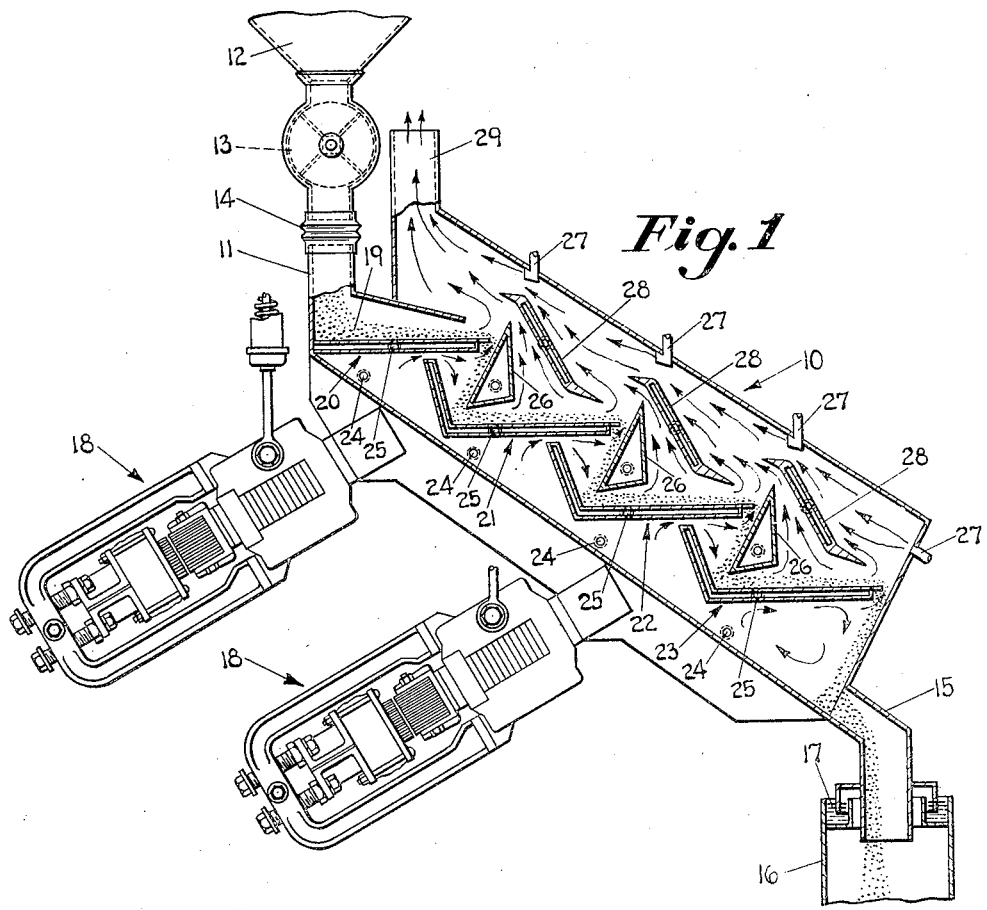
Figure 2:
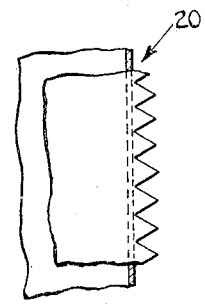

In the accompanying drawings,

Fig. 1 is a side elevational view of one form of apparatus involving my invention which is also adapted to carry out the improved method of my invention, with portions of the deck or chamber shown in section; and Fig. 2 is an enlarged detail view showing a serrated or saw-toothed discharge edge of one of the material supporting trays.

In the preferred form of the apparatus of my invention I provide a substantially completely enclosed deck or chamber 10 which at its upper or left-hand end is provided with a feed chute 11 through which granular material is fed from a hopper 12 under the control of a star feeder 13. A flexible connection 14 is provided between the discharge spout of the star feeder 13 and the feed chute 11 to provide for free vibration of the deck or chamber 10 while maintaining a seal for the feed mechanism above described.

Adjacent the bottom of the chamber 10 there is a discharge chute 15 which discharges the granular material, following its reaction, into a receptacle or stationary chute 16. A liquid seal 17 is provided between the chute 15 and the receptacle 16 which permits vibration of the chamber 10. Any other form of satisfactory seal may be employed.

The deck or chamber 10 is connected to the armatures of a pair of vibratory electric motors 18 which are of well known construction and may follow that disclosed in the patent to James A. Flint, No. 2,094,786, dated October 5, 1937. These vibratory motors 18 impart rectilinear vibratory motion to the deck 10 to effect a conveying and fluidizing action on the bed of granular material which is represented at 19 in a manner hereinafter explained more completely.

Within the enclosing walls of the chamber 10 and rigidly attached thereto and thus constituting parts of the deck there is a plurality of cascaded or stair like shelves or trays 20, 21, 22, and 23. As clearly illustrated in Fig. 1 of the drawings, the tray 20 is positioned to receive the granular material as it enters the chamber 10 through the feed chute 11. The vibratory motion imparted to the tray 20 by virtue of its attachment to the deck 10 will produce a positive conveying action on said material, conveying it to the right and over its discharge edge which is preferably serrated, as illustrated in Fig. 2 of the drawings, from which the bed of granular material will fall screen-like to the next shelf or tray 21. There a similar action will take place, the granular material being thus successively conveyed over the trays 20 to 23, inclusive, and finally discharged through the chute 15.

The vibratory motion imparted to the trays 20 to 23 not only effects a conveying action on the granular materials but is very effective to fluidize the bed 19 as it flows over said trays, as a consequence of which each individual particle of granular material in the bed will be constantly bounced about on said trays, all the while it is turning over and over, so as to expose all of its surface to direct contact with the adjacent atmosphere. As hereinafter described more completely, this atmosphere is charged with a fluid, preferably a gas, which is effective to produce a reaction with the granular material, thus effecting a chemical or physical change in the material introduced into the reaction chamber.

As one example of the type of reaction which I contemplate, the material fed to the reaction chamber 10 may be relatively fine hematite iron ore changed to an iron chloride within the reaction chamber and discharged as such by way of the discharge chute 15, the reaction being effected by the introduction of chlorine gas into the reaction chamber 10. For example, the chlorine gas may be introduced into the chamber 10 at one or more positions by means of feed pipes or openings 24 preferably located below the trays 20 to 23, inclusive.

In the preferred embodiment of my invention the trays 20 to 23 are preferably made hollow for either one of two purposes, depending upon the structure of the upper surface of said trays. In one form the upper surface of the trays, or at least some of them, is made of an imperforated plate and in this construction conditioning fluid, either gas or liquid, is introduced into the hollow tray to condition the material while it is undergoing the reaction. For example, hot air or hot water or cold air or cold water may be introduced into the hollow trays 20 to 23, inclusive, or one or more of them, by means of feed pipes 25, there preferably being inlet and outlet connections to said feed pipes 25 on opposite sides of the hollow trays 20 to 23, inclusive. By this means exothermic, and/or endothermic temperatures of reaction may be modified and/or controlled.

In another form of my invention the top plates of one or more of the trays 20 to 23, inclusive, may be provided with small perforations or with larger openings covered by a screen cloth, in which case the reaction fluid, which in the illustration given would be the chlorine gas, might be introduced into the hollow trays and flow upwardly through the bed of material undergoing reaction, which, in the illustration given, would be the hematite iron ore being converted to iron chloride.

As clearly illustrated in Fig. 1 of the drawings, each of the trays 20 to 23, inclusive, is substantially horizontal in its main portion, though trays 21, 22 and 23 each has an upwardly extending back portion which has the double function of co-operating with the bottom of the preceding tray to provide an orifice through which the reaction fluid flows and also constitutes a back board to receive the granular material from a preceding tray under the direction of a deflector, as hereinafter described more completely.

The serrated discharge edge of each of the trays 20 to 23 provides a thinning out or opening up of the screen of material as it flows over said edge, through which screen of material the reaction fluid (chlorine in the illustration given) flows, thus aiding the reaction.

To increase the length of the path of the fluidizing bed of material and thus to increase the time interval in which it is subject to reaction, consequently insuring a complete reaction, and also to provide a pair of partial seals, I employ deflectors 26 adjacent the discharge edge of each of the trays 20, 21 and 22 which extends downwardly to a position adjacent the left-hand or feed end of each of the succeeding trays 21, 22, and 23, respectively.

The deflectors 26, in the preferred and complete embodiment of my invention, are also preferably hollow to receive conditioning fluid, such as that delivered to the trays 20 to 23, inclusive or, if desired, the surface of these deflectors over which the material flows may be perforated or provided with screen cloth, and reaction fluid may be introduced into them, thus flowing through the perforated or screen surface and through the granular particles as they flow thereover.

It is to be noted that the deflectors 26 cause the granular particles in the bed 19 to flow in a direction which has a horizontal component of movement opposed to the horizontal component of movement thereof as it flows over the trays 20 to 23, inclusive. In other words, considering the horizontal movement of the particles only and ignoring their vertical movement, there is a reverse flow of the granular material with respect to its general direction of flow as it cascades from one tray 20, 21, etc., to the succeeding tray and flows over the deflectors 26.

Adjacent its upper end the deflector 26 is near the serrated edge of a tray, such as tray 20, while the bottom edge thereof is near the feed edge of the succeeding tray, such as tray 21. As a consequence there will be a partial seal at these two positions effected by the flowing bed of material 19 and this will tend to increase the intimacy of contact between the reaction fluid and the granular particles as they flow between these two seal areas and over the rear plate of the deflector 26.

All the while the material is flowing through the chamber 10 and undergoing reaction, new reaction fluid (chlorine in the illustration given) is preferably introduced through the pipes 24 as aforesaid and the spent or partially spent chlorine together with any resulting vapors, such as water vapor, are removed continuously. To effect such removal I provide one or more streams of air or other gas, which are either inert or supplementary to the reaction fluid, by way of inlets 27. The air or other gas introduced by the inlets 27 is preferably guided by deflectors 28, there being one such deflector 28 above each of the trays 21, 22 and 23. The gas and/or vapor thus to be discharged from the reaction chamber is conducted therefrom through a discharge pipe or flue 29 and the gas and/or vapors are conducted to any desired apparatus to recover the unspent reaction or other recoverable fluid if desired.

The deflectors 26 and 28 co-operate to provide a protecting hood over each of the trays 21, 22 and 23 and as the stream of air flows over the top of each deflector 28 it will produce a low pressure area under this hood or, in other words, directly above each tray 21, 22, and 23, by aspiration, thus drawing gases and/or vapors from the granular material undergoing reaction as it travels over each of said trays. In other words, there will be a jet action produced by the flow of fluid, which is air or gas under pressure, through the restricted orifice between the top of the chamber 10 and the top of each of the deflectors 28. In the complete embodiment of my invention the deflectors 28 are preferably made hollow and are provided with conditioning fluid similar to that above described in connection with the hollow trays 20 to 23, inclusive. The conditioning fluid may be, if desired, of different temperatures in the different chambered sections of the apparatus. By this means temperature may be increased in one or more sections, and decreased in other one or more sections.

In treating certain materials, such as finely ground hematite iron ore as above described, to convert it to iron chloride, it will be necessary to provide a protecting surface on all of the portions of the chamber 10 which come in contact therewith or with the reaction fluid. This may be accomplished either by coating the surfaces thereof with appropriate material or, if desired, all of the exposed parts, including the chamber 10, the trays 20 to 23, inclusive, and the deflectors 26 and 28, may be made of corrosion-proof materials, such as plastics or the like.

In the operation of the apparatus, with the consequent carrying out of the method of my invention, material to be treated, which in the illustration given is finely ground hematite iron ore, is fed from the hopper 12 through the star feeder 13 into the chamber 10, being first received at the feed or left-hand end of the tray 20. Vibratory motion imparted to the deck 10 and thus to the trays 20 to 23 as well as to the deflectors 26 and 28 will fluidize the bed of material 19 as well as convey it by positive conveying action over each tray 20 to 23 from the left to the right in a manner well understood in the art of vibratory conveyors.

As the bed of material spills over the serrated edge of each tray 20 to 23, it will form a screen which has been thinned out by virtue of said serrated discharge edge. This material, as it passes from tray 20, is cascaded onto tray 21 and as it flows downwardly under the influence of gravity it is also deflected rearwardly by the deflector 26, thus increasing the length of its path of flow through the chamber 10.

The fluid reagent, such as chlorine in the illustration given, will flow through the bed particularly as it passes over the deflector 26, some of the fluid also flowing through the partial seals formed by the screen of flowing granular material adjacent the serrated edge of tray 20 as well as the seal adjacent the bottom of the deflector 26 and the feed end of the following tray 21.

All the while this reaction is taking place, and if desired, the material undergoing reaction may be conditioned by introducing hot or cold fluid, either liquid or gas, into the hollow trays 20 to 23, inclusive, as well as into the hollow deflectors 26. Obviously the conditioning may be provided in one or more of the trays and/or deflectors and eliminated from the others. Also different conditioning effects may be produced in different ones of these hollow members. Still further, one or more of these hollow members may be perforate while one or more others are imperforate, and if they are perforate either a conditioning fluid or the reagent may be introduced into the chamber 10 through them.

As the material passes over the tray 21 in its fluidized condition the low pressure area created above it between the deflectors 26 and 28 will be effective to draw off water or other vapor as well as any gas from the bed by aspiration and convey it from the chamber 10 through the discharge pipe 29.

The action which takes place between the discharge end of the tray 20 and the discharge end of the tray 21 is substantially duplicated between the discharge end of the tray 21 and the discharge end of the tray 22 as well as between the discharge end of the tray 22 and the discharge end of the tray 23. Obviously the number of trays employed may be varied as desired.

Furthermore, it is evident that other means, such as an exhaust fan, might be employed to remove the vapors and/or gases from the chamber 10 if it is found desirable to remove them at all which it may not be under certain circumstances. In still other cases merely the pressure within the chamber 10 may be relied upon to force the vapors and gases therefrom through an opening at the top.

It is to be particularly noted that the frequency amplitude and direction of vibration of the motors 18 must be adequate not only to effect the conveying action above described, but also must be high enough so that the bed 19 does not move en masse but is highly fluidized or, in other words, such that each individual particle moves and rolls over and over with reference to each other individual particle, thus exposing the complete surface of each particle of granular material to the reaction of the reagent fluid.

As a consequence of these various factors, a substantially complete reaction and thus a high percentage of conversion of the granular material from one chemical form to another will take place as it travels in a continuous manner through the reaction chamber.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A continuous reaction chamber including an enclosed chamber having material feed and discharge openings, a plurality of individual successively spaced apart material supporting cascaded and stair like trays in said chamber each successively below the other over which a bed of material is adapted to flow successively in the same direction while dropping from one tray to another, motor means for imparting the same vibratory motion to said chamber and each of said trays which motion has both vertical and horizontal components of movement relative to said trays whereby all the material is given a positive conveying action independently of gravity and in the same direction by said vibratory motion of each of said trays and is also fluidized so that individual particles are turned over and over during the conveying action, deflector means spaced from and adjacent the discharge end of a tray and interposed between at least two trays over which material flows and having a rearwardly and downwardly sloping wall to produce a flow of material with a reverse horizontal component relative to the general direction of flow thereof over said trays, means for conditioning the temperature of said trays and said deflector means, and means for introducing a gaseous reaction reagent into said chamber and below said trays.

2. A continuous reaction chamber including an enclosed chamber having material feed and discharge openings, a plurality of individual successively spaced apart material supporting cascaded and stair like trays in said chamber each successively below the other over which a bed of material is adapted to flow successively in the same direction while dropping from one tray to another, motor means for imparting the same vibratory motion to each of said trays which motion has both vertical and horizontal components of movement relative to said trays whereby all the material is given a positive conveying action independently of gravity and in the same direction by said vibratory motion of each of said trays and is also fluidized so that individual particles are turned over and over during the conveying action, means for conditioning the temperature of said trays, and means for introducing a gaseous reaction reagent into said chamber and below said trays.

3. A continuous reaction chamber including an enclosed chamber having material feed and discharge openings, a plurality of individual successively spaced apart material supporting cascaded and stair like trays in said chamber each successively below the other over which a bed of material is adapted to flow successively in the same direction while dropping from one tray to another, motor means for imparting the same vibratory motion to each of said trays which motion has both vertical and horizontal components of movement relative to said trays whereby the material is given a positive conveying action independently of gravity and in the same direction by said vibratory motion of said trays and is also fluidized so that individual particles are turned over and over during the conveying action, deflector means spaced from and adjacent a discharge end of a tray and interposed between at least two trays over which material flows and having a rearwardly and downwardly sloping wall to produce a flow of material with a reverse hozizontal component relative to the general direction of flow thereof over said trays, and means for introducing a gaseous reaction reagent into said chamber.

4. A reaction chamber including an enclosing chamber, cascaded stair like supporting means in said chamber, means for vibrating said supporting means with the same motion to fluidize a bed of material thereon and impart positive conveying motion thereto independently of gravity causing the material to flow thereover in the same direction and cascade from one to the other, means for introducing a reaction gas into said chamber below said supporting means, deflector means including a member positioned between successive supporting means and spaced from and near the discharge end of one of said supporting means to cause material to flow in part counter to the general direction of travel thereof through said chamber, additional deflector means cooperating with said first named deflector means and constructed and arranged to form a protecting zone over at least one of said supporting means, and means for introducing a fluid flow through said chamber over said second named deflector means and to remove gases or vapors from said protected zone by aspiration.

5. A reaction chamber including an enclosing chamber, cascaded stair like supporting means in said chamber, means for vibrating said supporting means to fluidize a bed of material thereon and impart conveying motion thereto causing the material to flow thereover and cascade from one to the other, means for introducing a reaction gas into said chamber, deflector means including a member positioned between successive supporting means and spaced from and near the discharge end of one of said supporting means to cause material to flow in part counter to the general direction of travel thereof through said chamber, additional deflector means cooperating with said first named deflector means and constructed and arranged to form a protecting zone over at least one of said supporting means, and means for introducing a fluid flow through said chamber over said second named deflector means and to remove gases or vapors from said protected zone by aspiration.

6. A reaction chamber including an enclosing chamber, cascaded stair like supporting means in said chamber, means for vibrating said supporting means to fluidize a bed of material thereon and impart conveying motion thereto causing the material to flow thereover and cascade from one to the other, means for introducing a reaction gas into said chamber, deflector means, said deflector means being constructed and arranged to form a protecting zone over at least one of said supporting means, and means for introducing a fluid flow through said chamber over said deflector means and to remove gases or vapors from said protected zone by aspiration.

EDMUND F. FADER.

REFERENCES CITED

The following references are of record in the file of this patent:

UNITED STATES PATENTS

| Number | Name | Date |
| --- | --- | --- |
| 38,790 | Schuyler et al. | June 2, 1863 |
| 694,958 | Galschiot | Mar. 11, 1902 |
| 1,611,098 | Borner | Dec. 14, 1926 |
| 1,984,380 | Odell | Dec. 18, 1934 |
| 2,066,251 | Clemens | Dec. 29, 1936 |
| 2,094,785 | Flint | Oct. 5, 1937 |
| 2,296,498 | Brassert | Sept. 22, 1942 |
| 2,371,619 | Hartley | Mar. 20, 1945 |